(12) United States Patent
Sharma et al.

(10) Patent No.: US 8,042,036 B1
(45) Date of Patent: Oct. 18, 2011

(54) GENERATION OF A URL CONTAINING A BEGINNING AND AN ENDING POINT OF A SELECTED MARK-UP LANGUAGE DOCUMENT PORTION

(75) Inventors: Raman Sharma, Gurgaon (IN);
Ashutosh Sharma, New Delhi (IN);
Niraj Gupta, Faridabad (IN)

(73) Assignee: Adobe Systems Incorporated, San Jose, CA (US)

( * ) Notice: Subject to any disclaimer, the term of this patent is extended or adjusted under 35 U.S.C. 154(b) by 988 days.

(21) Appl. No.: 11/491,069

(22) Filed: Jul. 20, 2006

(51) Int. Cl.
*G06F 17/00* (2006.01)

(52) U.S. Cl. ............ 715/208; 715/232; 715/241

(58) Field of Classification Search ............ 715/208, 715/241, 232
See application file for complete search history.

(56) References Cited

U.S. PATENT DOCUMENTS

| | | | |
|---|---|---|---|
| 5,659,729 A | 8/1997 | Nielsen | |
| 5,898,836 A | 4/1999 | Freivald et al. | |
| 5,982,370 A | 11/1999 | Kamper | |
| 6,574,644 B2 * | 6/2003 | Hsu et al. | 715/205 |
| 6,763,496 B1 | 7/2004 | Hennings et al. | |
| 6,950,987 B1 | 9/2005 | Hargraves et al. | |
| 6,961,909 B2 | 11/2005 | Lord et al. | |
| 2001/0049698 A1 * | 12/2001 | Hsu et al. | 707/501.1 |
| 2005/0034063 A1 * | 2/2005 | Baker et al. | 715/513 |
| 2005/0055458 A1 | 3/2005 | Mohan et al. | |
| 2005/0066269 A1 | 3/2005 | Wang | |
| 2005/0149576 A1 * | 7/2005 | Marmaros et al. | 707/200 |
| 2005/0149851 A1 | 7/2005 | Mittal | |
| 2005/0268214 A1 | 12/2005 | Lu | |
| 2006/0026496 A1 | 2/2006 | Joshi et al. | |
| 2006/0046686 A1 | 3/2006 | Hawkins et al. | |
| 2007/0208704 A1 | 9/2007 | Ives | |

OTHER PUBLICATIONS

Wilde, Erik. "URI Fragment Identifiers for the text/plain Media Type". The Internet Society, Jul. 11, 2002.*
Wilde, Erik et al. "Fragment Identifiers for Plain Text Files". Association for Computing Machinery, Sep. 9, 2005.*
Kannan, Natarajan et al. "Live URLs: Breathing life into URLs". Association for Computing Machinery, May 26, 2006.*
"Adobe Acrobat 7.0: PDF Open Parameters". Adobe, Jul. 11, 2005.*
Sklar, David et al. "PHP Cookbook", p. 342-343. Jan. 14, 2004, O'Reilly.*
Markham, Gervase. "Fragment Search". Archived copy dated Feb. 16, 2007 retrieved from <http://web.archive.org/web/2007 0216023326/http://www.gerv.net/software/fragment-search/>.*

* cited by examiner

*Primary Examiner* — Cesar Paula
*Assistant Examiner* — Tyler Schallhorn
(74) *Attorney, Agent, or Firm* — Robert C. Kowert; Meyertons, Hood, Kivlin, Kowert & Goetzel, P.C.

(57) ABSTRACT

A method for generating a link is provided. In this method, a selection of a portion associated with a resource is provided. The portion is identified by a portion identifier. Additionally provided is a link to the resource on a computer network. To generate the link, the portion identifier is embedded into the link.

23 Claims, 8 Drawing Sheets

GENERATION OF A URL CONTAINING A BEGINNING AND AN ENDING POINT OF A SELECTED MARK-UP LANGUAGE DOCUMENT PORTION

CROSS-REFERENCES TO RELATED APPLICATIONS

This application is related to U.S. patent application Ser. No. 11/441,636, filed on May 25, 2006, and entitled "Locating a Portion of Data on a Computer Network," the disclosure of which is incorporated herein by reference.

FIELD OF THE INVENTION

The present invention relates generally to software and, more particularly, to the generation of a link to a portion of a resource.

BACKGROUND

A Uniform Resource Locator (URL) is the primary way to refer to or address resources on the Internet. Examples of such resources include HyperText Markup Language (HTML) documents, image files, video files, and other resources. In general, a URL is a string of characters conforming to a standardized format that refers to resources on the Internet by their location. For example, a URL may include the resource's name (e.g., file name) preceded by a hierarchy of directory names in which the resources are stored.

Currently, to reference a location in a document (e.g., HTML document), the URL provides an anchor identifier that points to a specific location within the document. The anchor identifier follows the server and pathname of the URL and is separated by the crosshatch "#" character. A corresponding anchor is inserted into the specific location in the document. When a Web browser reads a URL with an anchor identifier, the anchor identifier indicates to the client Web browser that it should begin displaying or scrolling the document from the specified location of the anchor.

A limitation associated with the anchor is that the anchor could only point to a specific location in the document. The anchor cannot reference a particular region or portion of the document. Thus, a URL cannot be used to reference a region in the document. Such anchor limitation limits the functionalities of application programs that may need more level of detail when using URLs to point to a document. For example, a user may want to bring attention to a specific region within a Web page and communicate this specific region to other users. One method to bring attention to this specific region is to highlight the specific portion. However, the only way currently to highlight this specific region is to modify the source code of the Web page, and typically, a user cannot modify the source code.

In view of the foregoing, there is a need for continuing efforts to improve the reference capabilities of a URL.

BRIEF DESCRIPTION OF THE DRAWINGS

Various embodiments of the invention are disclosed in the following detailed description and the accompanying drawings.

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

Embodiments described herein provide the generation of a link, such as a Uniform Resource Locator (URL), to a portion of a resource on a computer network. As explained in more detail below, the link may be embedded with a portion identifier that identifies one or more portions of a resource. With the portion identifier embedded in the link, the portion of the resource may be located based on the portion identifier extracted from the link and, in an embodiment, presented such as to bring attention to this specific portion of the resource.

Figure 1:
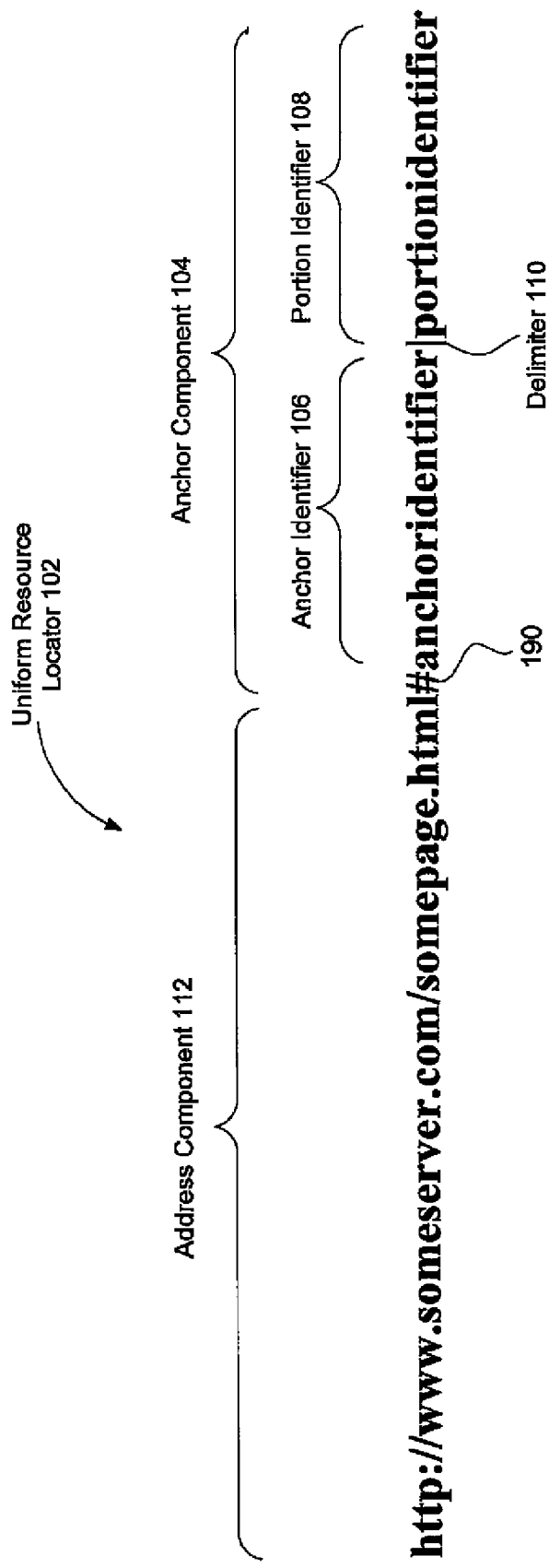
FIG. 1 is a diagram of an example of a portion identifier embedded in a Uniform Resource Locator (URL), in accordance with an embodiment.

FIG. 1 is a diagram of an example of a portion identifier embedded in a URL, in accordance with an embodiment. In general, URL 102 is a string of alphanumeric characters that refers to a resource (e.g., HyperText Markup Language (HTML) documents, graphic files, sound files, video files, and other data) on a computer network by the location of the resource. As shown in FIG. 1, URL 102 may comprise an address component 112 and an anchor component 104. Syntax associated with address component 112 can include a scheme, an authority, and a resource path. URL 102 begins with a scheme and is followed by a colon character. A scheme is the top level of the URL naming structure and can indicate a network protocol used to retrieve the resource over the computer network. Examples of schemes include "http" for Hypertext Transfer Protocol (HTTP), "https" for HTTP over Secure Socket Layer (SSL), "ftp" for File Transfer Protocol, and other schemes. The authority includes the host name, such as the domain name or Internet Protocol (IP) address of a server, that provides or stores the resource. The path is a specification of a location of the resource in a hierarchical structure, such as a directory path.

Anchor component 104 may include anchor identifier 106 and, in an embodiment, may additionally include portion identifier 108. Anchor component 104 is separated from address component 112 by crosshatch "#" character 190. It should be appreciated that interpretation of anchor component 104 is performed by a client (e.g., a Web browser) with participation from a server (e.g., a Web server). When a client requests a resource from the Web server, the client sends address component 112 to the Web server, but does not send anchor component 104. Instead, the client waits for the Web server to send the resource identified in URL 102 and then processes the resource based on anchor component 104. Therefore, anchor component 104 is not passed to other systems during the process of resource retrieval.

Anchor identifier 106 defines the name of an anchor. In the example of FIG. 1, anchor identifier 106 "anchoridentifier" points to an anchor located within a resource with the name "anchoridentifier." In general, an anchor may be used to identify a location within the resource. The anchor therefore describes a link between two locations. As such, the anchor may be used as a pointer to a location within the resource. The anchor may be represented by a variety of language formats, such as HTML, Extensible Markup Language (XML), and other language formats. For example, within a resource, an anchor may be defined as "<a name="anchor name"/>" in HTML.

Portion identifier 108 identifies one or more portions associated with the resource. The portion may include an area, a region, a section, one or more lines of code, one or more characters within a line of code, and other portions associated with a resource. In an embodiment, the portion may be identified by a boundary associated with the portion. The boundary, for example, may be defined by the beginning of a portion and an end of a portion. In an embodiment, the portion identifier may include the start character count and an end character count associated with the portion. The character count is to the character offset within a resource, such as an HTML document. For instance, portion identifier 108 may be defined as "c:4132, 5342," which identifies a portion of a resource beginning at character position 4132 and ends at character position 5342. It should be noted that the character count can be based on a count of the characters associated with the source code that comprise the resource or based on a count of characters that are rendered for display. In another embodiment, portion identifier 108 may include one or more characters (e.g., a number, a word, a set of words, and other characters) associated with a start of the portion and one or more characters associated with an end of the portion. For example, portion identifier 108 may be defined as "sw:'About',3&ew:'there',2," which identifies a portion of a resource that begins where the word "About" occurs for the third time in the resource and ends where the word "there" occurs for the second time in the resource.

It should be noted that within anchor component 104, portion identifier 108 is separated from anchor identifier 106 by delimiter 110. Delimiter 110 is used to separate or mark the beginning and/or end of portion identifier 108. FIG. 1 shows the use of a vertical "i" character as delimiter 110 to mark the beginning of portion identifier 108, but the delimiter can include a variety of other characters, such as brackets "{" and "}" and symbols "*", "%", "^", and other characters. Another delimiter can also be included at end of portion identifier 108 to mark the end of the portion identifier.

Figure 2:
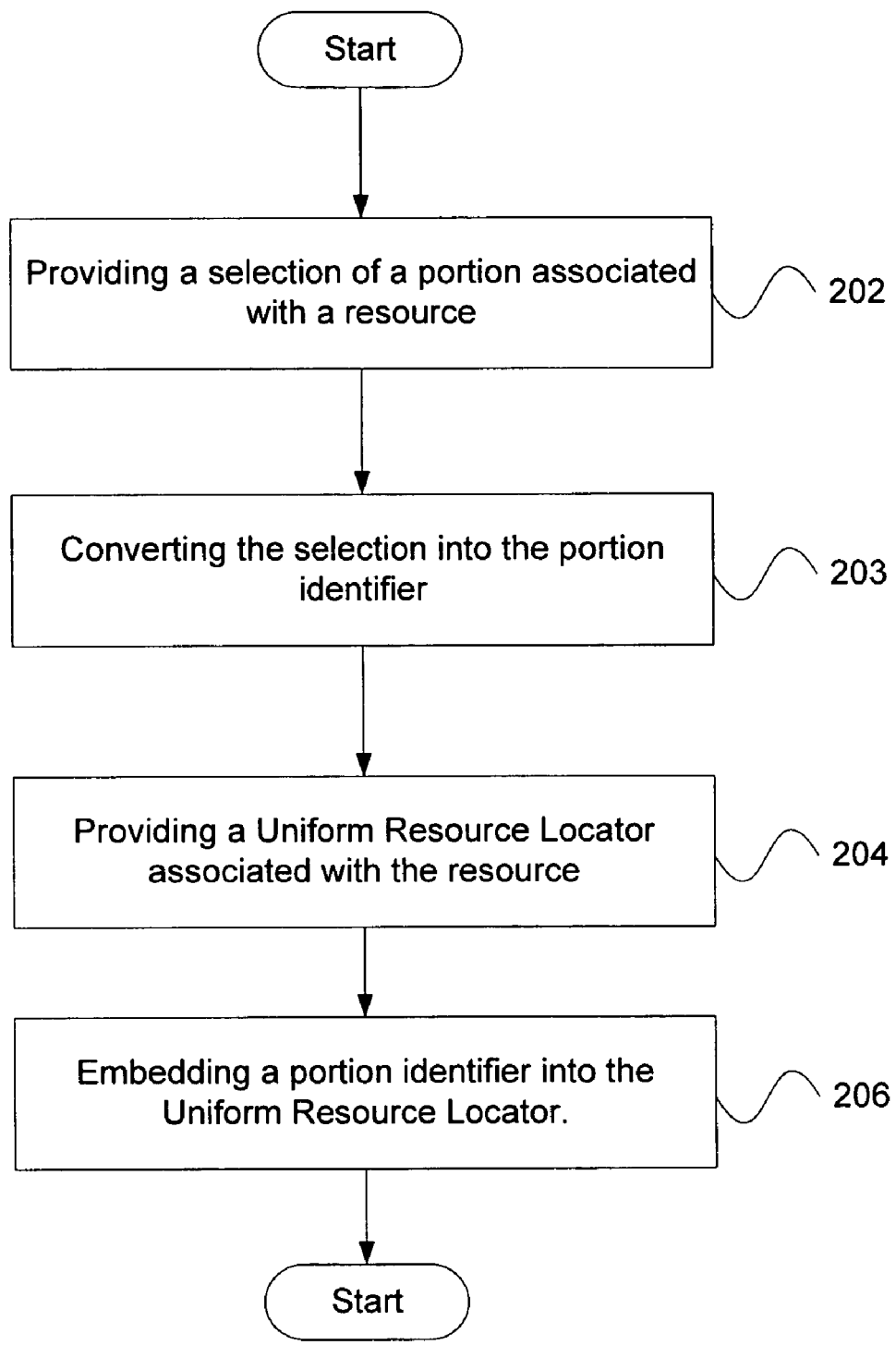
FIG. 2 is a flowchart diagram of a high level overview for generating a URL with embedded portion identifier, in accordance with an embodiment.

FIG. 2 is a flowchart diagram of a high level overview for generating a URL with an embedded portion identifier, in accordance with an embodiment. As shown in FIG. 2, a selection of a portion associated with a resource is provided in operation 202. A user may select a variety of portions associated with a resource. For example, a user may select a paragraph of texts associated with an HTML document by dragging a cursor over the texts. In another example, a user may select a sentence by holding down the key "CTRL" on the keyboard, moving a cursor over a portion of the sentence, and clicking the mouse. In another example, a user may select a portion of an image by a variety of selection tools. Examples of image selection tools include marquee tools, lasso tools, magic wand, and other selection tools.

With the selection of a portion provided, in an embodiment, the selection may be converted into a portion identifier in operation 203. As discussed above, the portion identifier is configured to identify the selected portion of the resource. In an embodiment, the portion identifier is configured to identify the boundary of the portion. For example, the portion identifier can be configured to identify a beginning of the portion and an end of the portion. If the beginning and end of the portion are identified by a character count, then a count of the characters is conducted to determine the beginning character position and the end character position associated with the portion of the resource. For example, the a count of the character offset may be conducted from the beginning of a document to the start and end characters positions associated with the portion of the document. If the beginning and end of the portion are identified by characters, then the characters (e.g., words) at the beginning and the end of the portion may be extracted and included in portion identifier.

A URL that is associated with the resource is also provided in operation 204 and, as discussed above, the URL includes an anchor component. In operation 206, the portion identifier is embedded into the URL to generate a URL that includes information for identifying a portion of the resource. In an embodiment, the portion identifier is embedded into or within the anchor component. As discussed above, the portion identifier is separated from an anchor identifier within the anchor component by one or more delimiters.

Figure 3A:
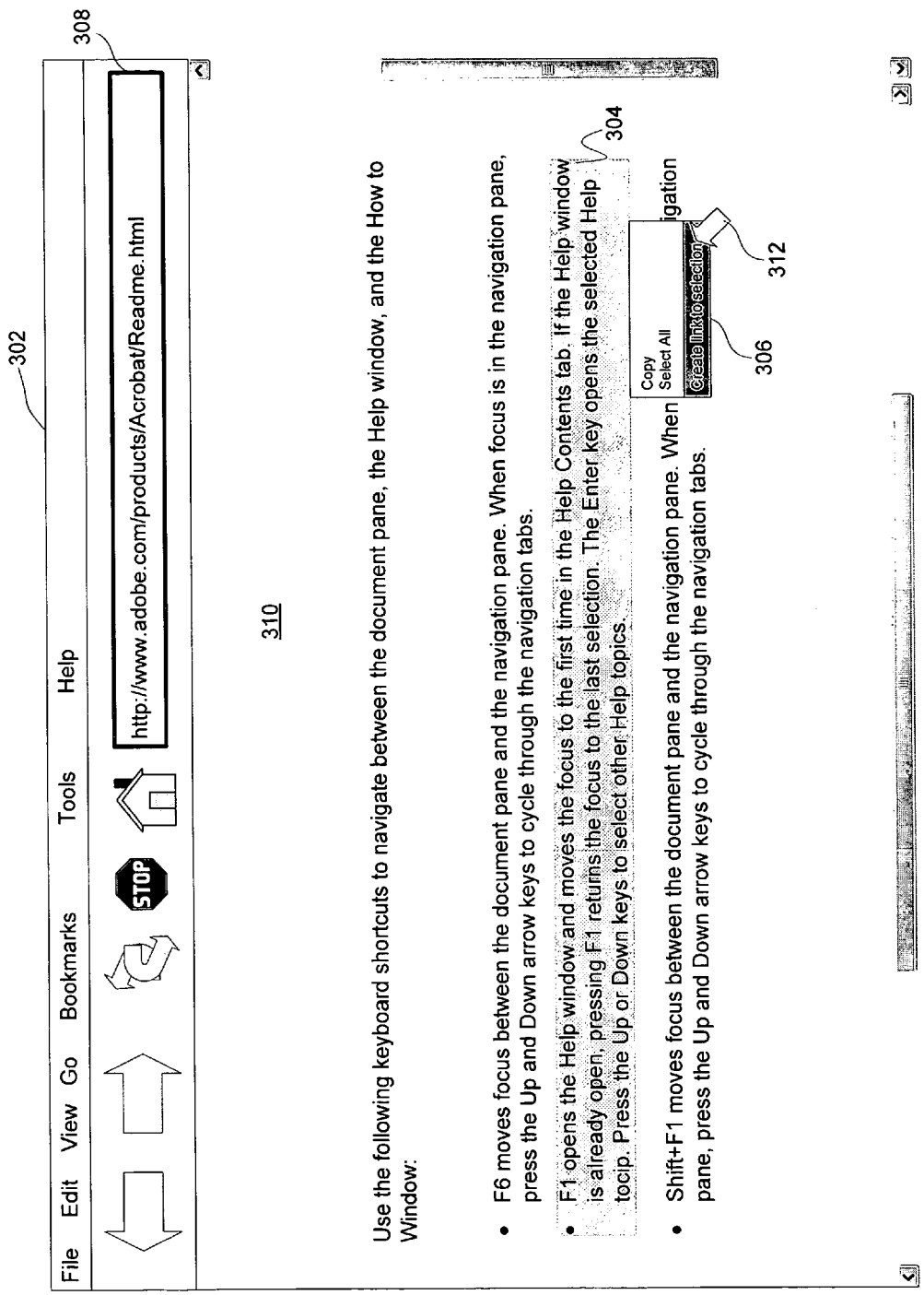
FIGS. 3A and 3B are screenshots illustrating the generation of a URL with an embedded portion identifier, in accordance with an embodiment.
Figure 3B:
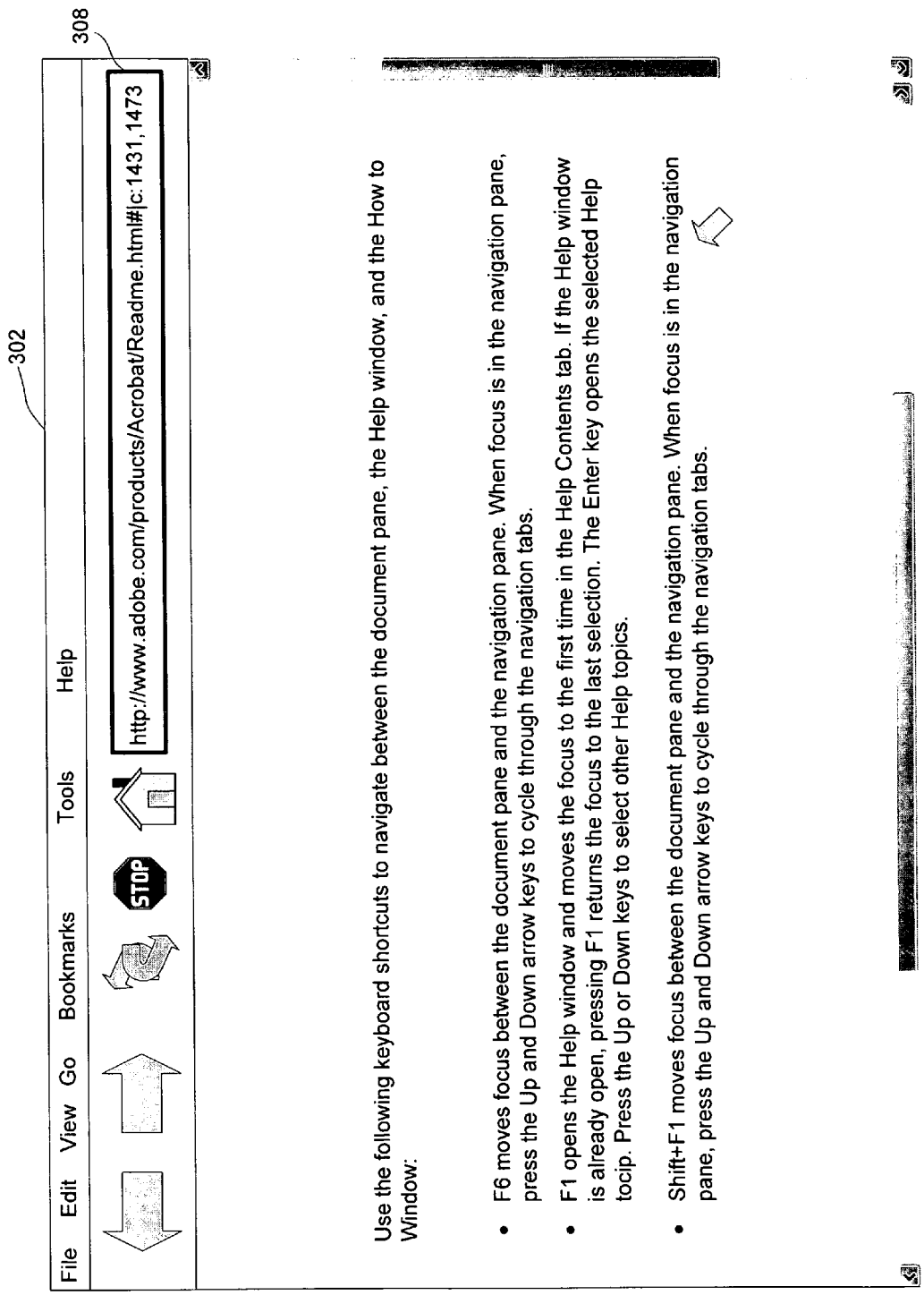

FIGS. 3A and 3B are screenshots illustrating the generation of a URL with an embedded portion identifier, in accordance with an embodiment. FIG. 3A shows a screenshot of Web browser 302. It should be appreciated that Web browser 302 is a software application that enables a user to display and interact with text, images, and other information associated with a resource such as a Web page. Web browser 302 includes region 308 that is configured to display the URL associated with the Web page. Additionally included within Web browser 302 is region 310 that is configured to display text and other information associated with the Web page. In this example, the URL associated with the Web page is "http://www.adobe.com/products/Acrobat/Readme.html" and the URL does not include an anchor component because the URL does not include a crosshatch "#" character that separates the anchor component from the address component.

In the example of FIG. 3A, a user selects portion 304, which is a paragraph of words, of the Web page by dragging cursor 312 over the portion. As a result, portion 304 is highlighted. The user may then select a command by way of menu 306 to embed a portion identifier associated with portion 304 into the URL shown in region 308. In other words, the user may thereafter select a command to generate a link to selected portion 304. With the selection of portion 304 provided, in an embodiment, the selection may then be converted into a portion identifier. In this example, the portion identifier is configured to define a character count associated with the beginning and end of portion 304. Here, the beginning character position of portion 304 is 1431 and the end character position of the portion is 1473. Accordingly, the portion identifier associated with portion 304 can be defined as "c:1431,1473."

To generate a link to portion 304, the portion identifier is embedded (e.g., appended or concatenated) into the URL. For example, as shown in FIG. 3B, region 308 displays the URL with the embedded portion identifier. In this example, the portion identifier is embedded into an anchor component of the URL by appending the crosshatch "#" character and portion identifier "c:1431,1473" to the address component to create "http://www.adobe.com/products/Acrobat/Readme.html#|c:1431,1473." The crosshatch "#" character marks the beginning of an anchor component and the delimiter "|" marks the beginning of the portion identifier. It should be noted that the generated URL (or link to portion 304) does not need to appear in region 308. Instead, the URL could be copied to a copy buffer or clipboard for use by a user.

Figure 4:
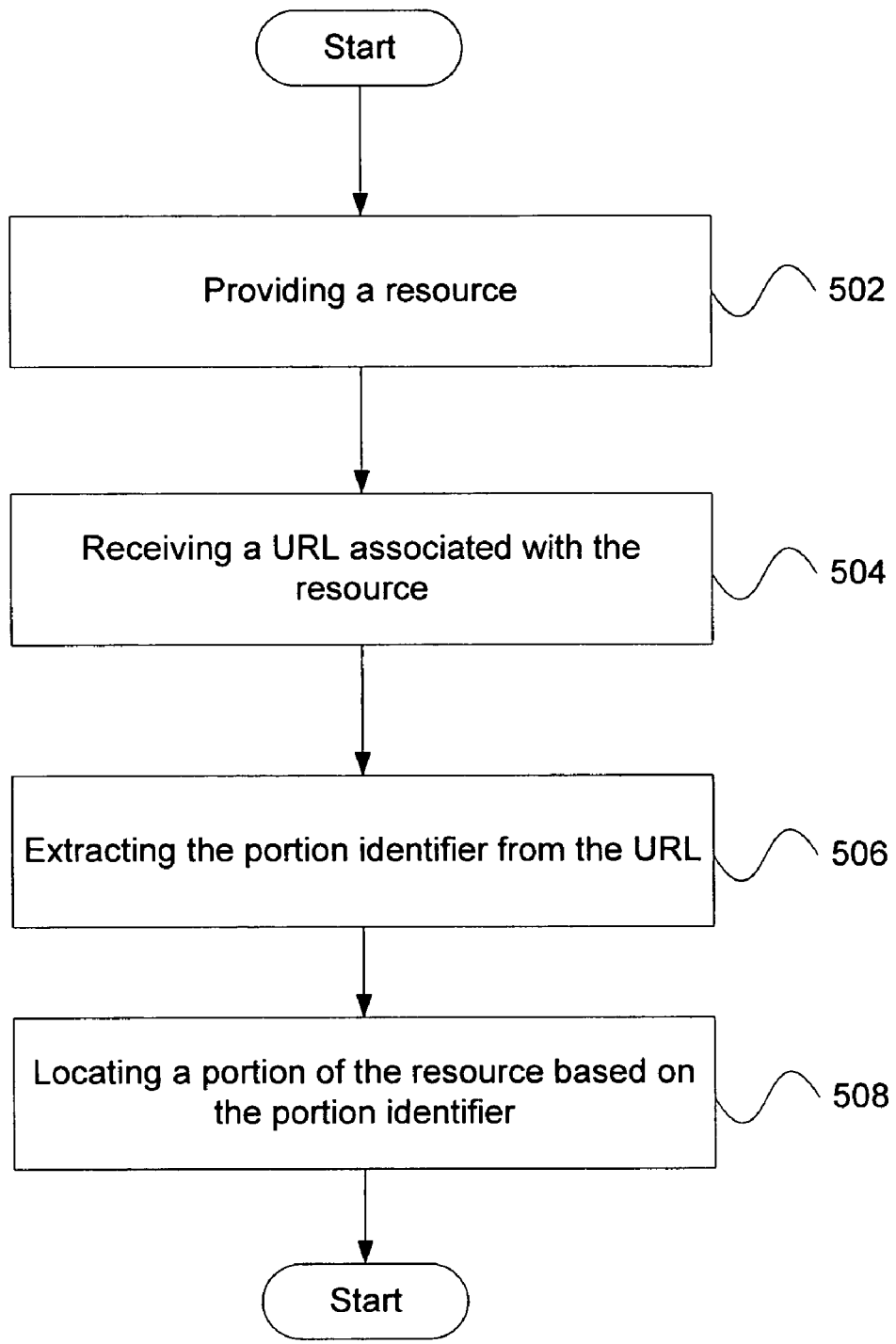
FIG. 4 is a flowchart diagram of a high level overview for processing a URL with an embedded portion identifier, in accordance with an embodiment.

FIG. 4 is a flowchart diagram of a high level overview for processing a URL with embedded portion identifier, in accordance with an embodiment. As shown in FIG. 4, a resource is provided in operation 502. The resource may be provided by retrieving the resource stored on a server. Thereafter, the URL associated with the resource is received in operation 504. The URL is embedded with a portion identifier and the portion identifier is extracted from the URL in operation 506. For example, the portion identifier may be extracted from the URL by reading the characters after a delimiter within an anchor component that identifies the beginning of a portion identifier, such as a delimiter with a "|" character. With the portion identifier, the portion of the resource can thereafter be located based on the portion identifier in operation 508. With the portion identified, in an embodiment, the Web browser can automatically scroll to the portion of the resource and, as explained in more detail below, can present the portion.

Figure 5:
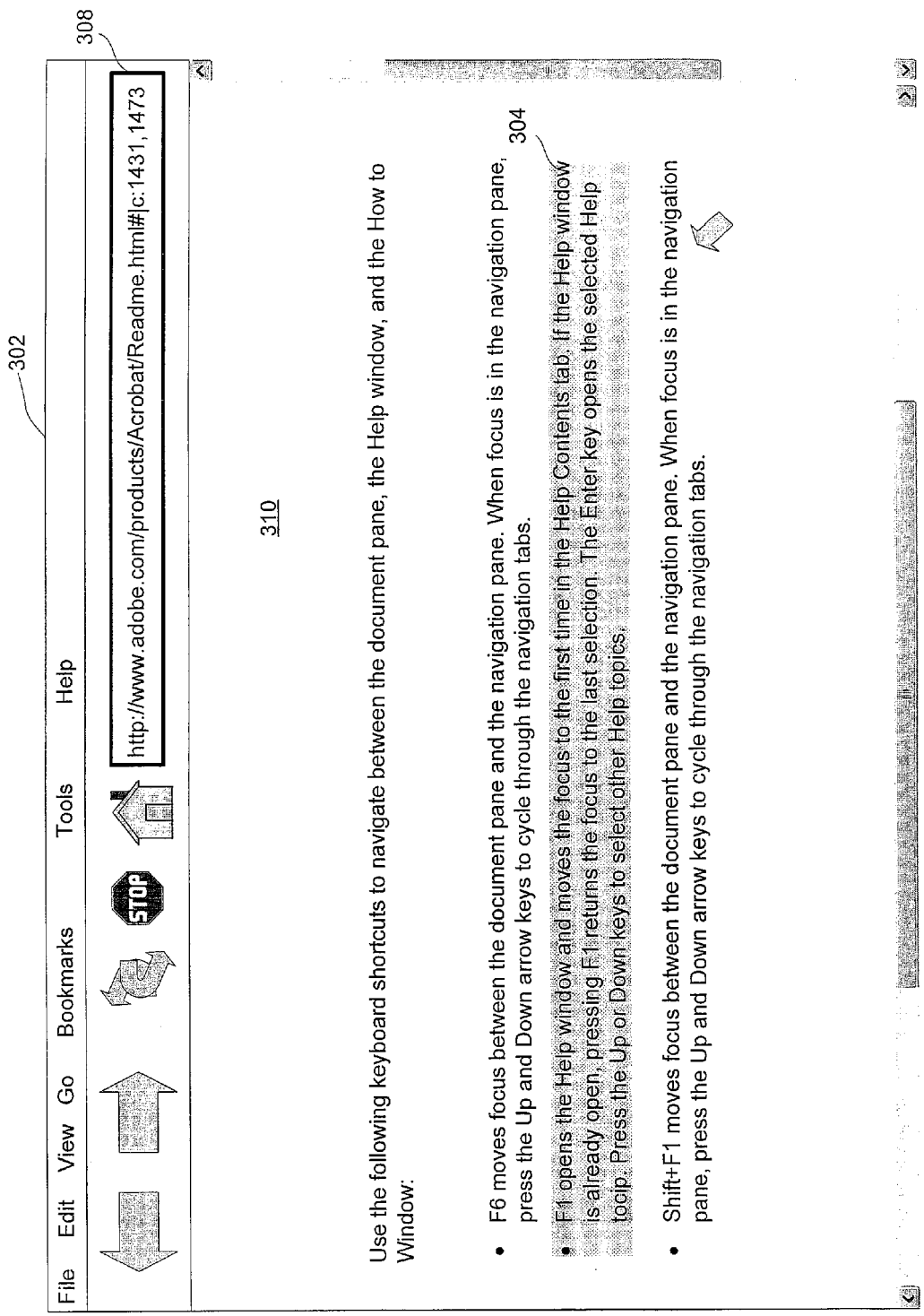
FIG. 5 is a screenshot illustrating the processing of a URL with an embedded portion identifier, in accordance with an embodiment.

FIG. 5 is a screenshot illustrating the processing of a URL with an embedded portion identifier, in accordance with an embodiment. FIG. 5 shows a screenshot of Web browser 302. Web browser 302 includes region 308 that is configured to display the URL associated with the Web page. Additionally included within Web browser 302 is region 310 that is configured to display text and other information associated with the Web page. Here, region 308 shows that the URL associated with the Web page is "http://www.adobe.com/products/Acrobat/Readme.html#|c1431,1473." The portion identifier is embedded within the URL and, in this example, the portion identifier is embedded within the anchor component. The crosshatch "#" character marks the beginning of an anchor component and the delimiter "|" marks the beginning of the portion identifier. The portion identifier "c:1431,1473" is extracted from the URL. Here, the beginning character position of portion 304 is 1431 and the end character position of the portion is 1473. For example, the beginning character position 1431 can be the 1431st character displayed, beginning from the top of the displayed document, and the end character position 1473 can be the $1473^{rd}$ character displayed. Accordingly, portion 304 of the Web page is located by counting the characters within the resource.

Web browser 302 may scroll to portion 304 and present the portion. It should be appreciated that portion 304 may be presented by a variety of methods. For example, in an embodiment, the portion may be highlighted to make the portion visually distinct from other information displayed in region 310 of the Web browser. For example, as shown in FIG. 5, portion 304 is highlighted by filling the portion with a color that is different from the background. It should be appreciated that a variety of highlighting techniques may be used to make portion 304 visually distinct from other information displayed. For example, texts associated with portion 304 may be changed to colors and fonts that are different from the other information displayed. In another embodiment, portion 304 may be presented by displaying only the portion and not other information displayed in region 310.

Figure 6:
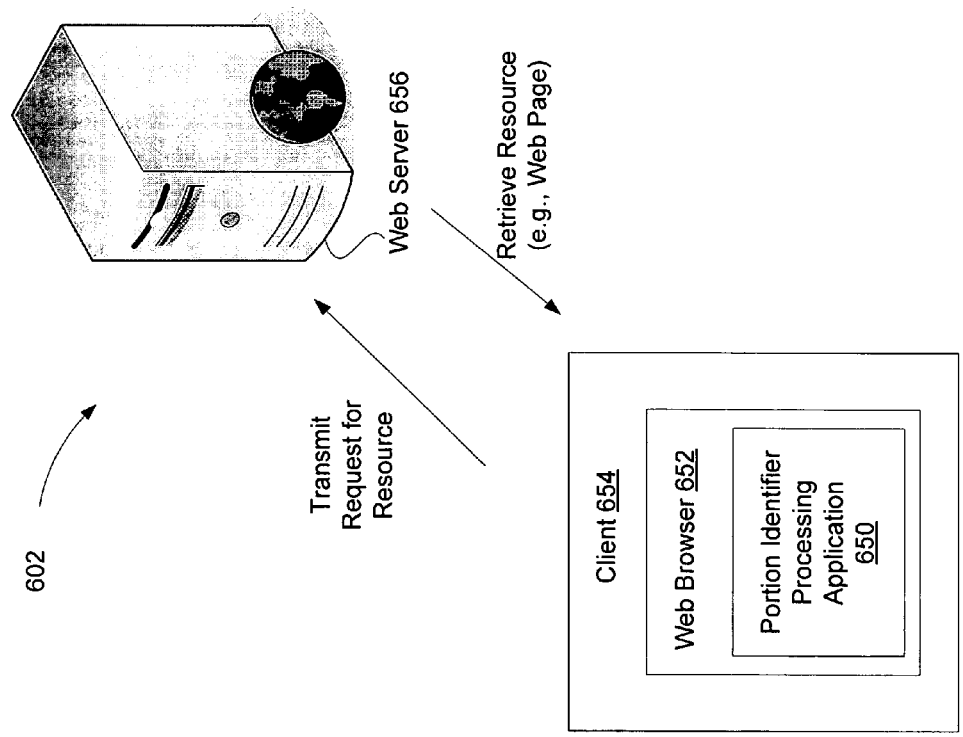
FIG. 6 is a simplified block diagram of a system for generating and processing a URL with an embedded portion identifier, in accordance with an embodiment.

FIG. 6 is a simplified block diagram of a system for generating and processing a URL with an embedded portion identifier, in accordance with an embodiment of the invention. As shown in FIG. 6, system 602 includes Web server 656 in communication with client 654 by way of a computer network, which can include local area network (LAN), Internet, and direct connections. Web server 656 is a server configured for accepting HTTP requests from clients, such as client 654, and serving the clients with resources, such as Web pages. Web browser 652 may be hosted on client 654 and the Web browser may include portion identifier processing application 650 as a plug-in to interact with the Web browser to provide the generation and/or processing of a portion identifier within a URL, as described above. In addition to Web browser 652, it should be appreciated that portion identifier processing application 650 can be included in or interact with a variety of other applications executed on client 654.

To retrieve a resource (e.g., a Web page), client 654 (or Web browser 652) transmits a request to Web server 656 located at a URL (with embedded portion identifier) associated with the resource. In response to the request, Web server 656 transmits the resource to client 654. The resource may be stored on Web server 656 or provided to the Web server for transmission to client 654. With the resource provided, portion identifier processing application 650 may, for example, extract the portion identifier from the URL, locate the portion of the resource based on the portion identifier, and highlight the portion of the resource. It should be noted that portion identifier processing application 650 may additionally, for example, convert the selection of the portion into a portion identifier and embed the portion identifier into the URL.

Figure 7:
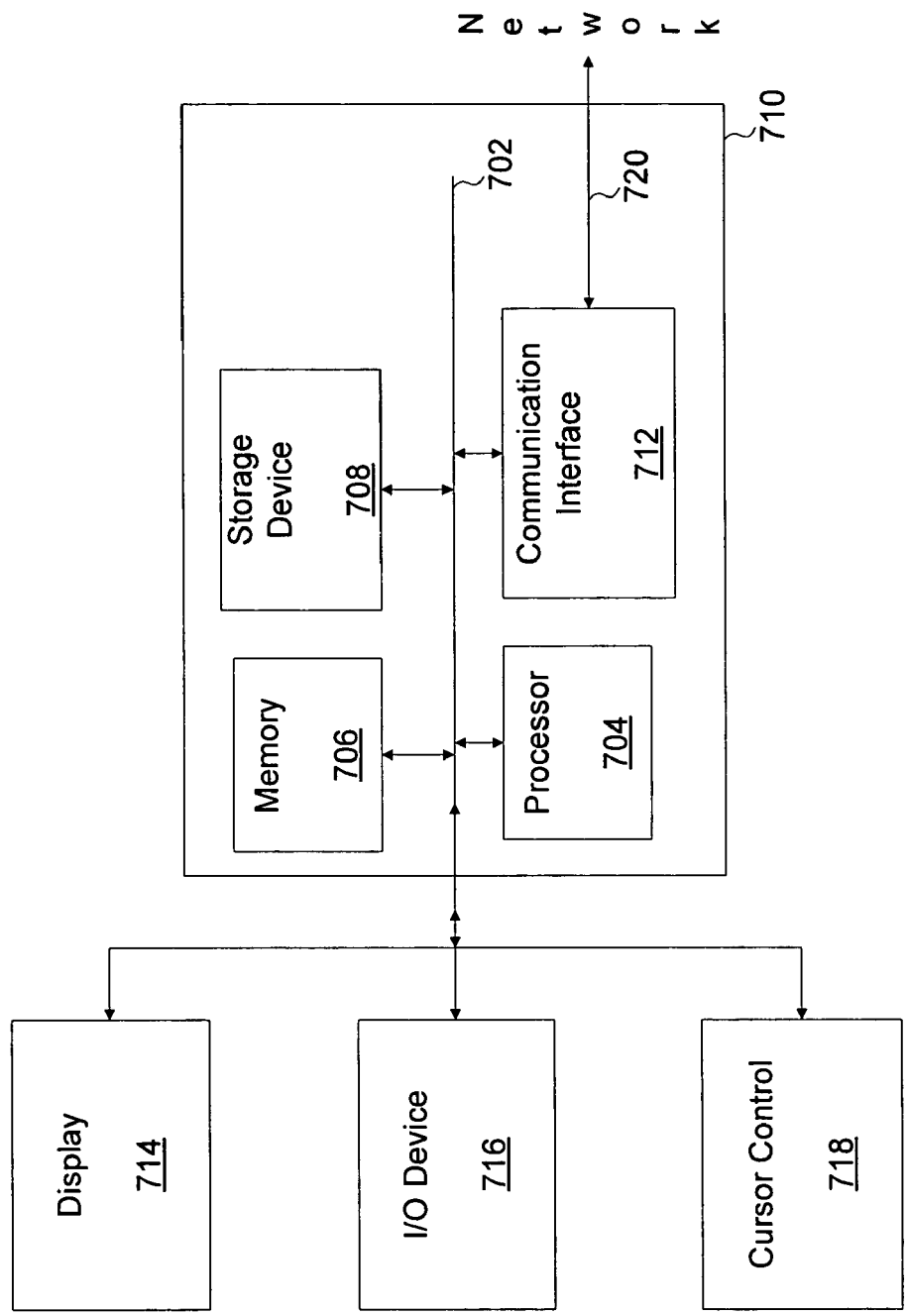
FIG. 7 is a simplified block diagram of an example of a computing device that is suitable for processing a portion identifier associated with a URL, in accordance with an embodiment.

FIG. 7 is a simplified block diagram of an exemplary computing device that is suitable for generating a portion identifier associated with a URL, in accordance with an embodiment. In some embodiments, computing device 710 may be used to implement computer programs (e.g., Web browser and portion identifier processing application of FIG. 6), logic, applications, methods, processes, or other software to generate a portion identifier. Examples of computing device 710 include a desktop computer, a server, a portable computing device, a personal digital assistant, a computational engine within an appliance, and other computer systems. As shown in FIG. 7, computing device 710 includes bus 702 or other communication mechanism for communicating information, which interconnects subsystems and devices, such as processor 704, system memory 706 (e.g., random access memory (RAM)), storage device 708 (e.g., read only memory (ROM), magnetic disk drives, optical disk drives, and other storage devices), communication interface 712 (e.g., modem or Ethernet card), display 714 (e.g., cathode ray tube (CRT) or liquid crystal display (LCD)), input/output device 716 (e.g., keyboard), and cursor control 718 (e.g., mouse or trackball).

In some embodiments, computing device 710 performs specific operations by processor 704 when executing one or more sequences of one or more program instructions stored in system memory 706. Such program instructions may be read into system memory 706 from another computer readable medium, such as storage device 708. In some embodiments, hard-wired circuitry may be used in place of or in combination with software program instructions to implement embodiments of the invention.

It should be appreciated that the term "computer readable medium" refers to suitable medium that participates in providing program instructions to processor 704 for execution. Such a medium may take many forms, including but not limited to, non-volatile media, volatile media, and transmission media. Non-volatile media may include, for example, optical or magnetic disks, such as storage device 708. Volatile media may include dynamic memory, such as system memory 706. Transmission media includes coaxial cables, copper wire, and fiber optics, including wires that comprise bus 702. Transmission media can also take the form of acoustic or light waves, such as those generated during radio wave and infrared data communications. Common forms of computer readable media includes, for example, magnetic mediums (e.g., floppy disk, flexible disk, hard disk, magnetic tape, and other magnetic mediums), optical mediums (e.g., compact disc read-only memory (CD-ROM) and other optical mediums), physical medium with patterns (e.g., punch cards, paper tape, any other physical mediums), memory chips or cartridges, carrier waves, (e.g., RAM, programmable read-only memory (PROM), erasable programmable read-only memory (EPROM), flash memory, and other memory chips or cartridges), and any other medium from which a computer can read.

In some embodiments, execution of the sequences of program instructions to practice the embodiments may be performed by a single computing device 710. In other embodiments, two or more computer systems, such as computing device 710, coupled by communication link 720 (e.g., local area network (LAN), public switched telephone network (PSTN), wireless network, and other communication links) may perform the sequence of program instructions to practice the embodiments in coordination with one another. In addition, computing device 710 may transmit and receive messages, data, and instructions, including program, i.e., application code, through communication link 720 and communication interface 712. Received program instructions may be executed by processor 704 as the program instructions are received, and/or stored in storage device 708, or other non-volatile storage for later execution.

The above-described embodiments provide methods and systems for generating a link to a portion of a resource. By embedding a portion identifier into the link, the link can be configured to include information that points to one or more portions of a resource. As a result, if a user wants to bring attention to a specific portion of a resource, the user can generate a link with an embedded portion identifier and share the link with other users. Furthermore, the portion of the resource may be located and highlighted by referencing the link and accordingly, a user does not need to modify the source code of the Web page in order to highlight the portion.

Although the foregoing examples have been described in some detail for purposes of clarity of understanding, the embodiments are not limited to the details provided. There are many alternative ways of implementing the embodiments. The disclosed examples are illustrative and not restrictive.

What is claimed is:

1. A method, comprising:
   receiving user input selecting a portion of a mark-up language document in a display;
   determining a portion identifier for the selected portion, wherein the portion identifier specifies a beginning point comprising one or more consecutive start characters and an occurrence number associated with the one or more consecutive start characters, and an ending point comprising one or more consecutive end characters and an occurrence number associated with the one or more consecutive end characters of the selected portion within the mark-up language document;
   obtaining a Uniform Resource Locator (URL) for the mark-up language document; and
   in response to said receiving, generating a new URL including the URL for the mark-up language document and the portion identifier.

2. The method of claim 1, further comprising converting the selected portion into the portion identifier.

3. The method of claim 1, wherein the new URL comprises an anchor component, wherein the anchor component comprises an anchor identifier and the portion identifier, wherein the portion identifier is separated from the anchor identifier by a delimiter, and wherein the anchor identifier indicates a specific location at which an anchor exists within the mark-up language document.

4. The method of claim 1, wherein the portion identifier is configured to identify a boundary of the portion.

5. A method, comprising:
   receiving a Uniform Resource Locator (URL) for a portion within a mark-up language document, the URL comprising a URL for the mark-up language document and a portion identifier, wherein the portion identifier specifies a beginning point and an ending point of the portion within the mark-up language document;
   wherein the beginning point comprises:
      one or more characters matching the beginning, but less than all, of the portion and an occurrence number identifying an occurrence of the one or more characters matching the beginning; and
   wherein the ending point comprises:
      one or more characters matching the end, but less than all, of the portion and an occurrence number identifying an occurrence of the one or more characters matching the end;
   extracting the portion identifier from the URL for the portion; and
   locating the portion of the mark-up language document based on the portion identifier.

6. The method of claim 5, further comprising presenting the portion of the mark-up language document.

7. The method of claim 5, wherein the portion identifier is configured to identify a boundary of the portion.

8. A non-transitory computer readable storage medium storing instructions executable by a processor to implement:
   receiving user input selecting a portion of a mark-up language document in a display;
   determining a portion identifier for the selected portion, wherein the portion identifier specifies a beginning point comprising one or more start characters and an occurrence number associated with the one or more start characters, and an ending point comprising one or more end characters and an occurrence number associated with the one or more end characters of the selected portion within the mark-up language document;
   obtaining a Uniform Resource Locator (URL) for the mark-up language document; and
   in response to said receiving:
      generating a new URL including the URL for the mark-up language document and the portion identifier.

9. The non-transitory computer readable storage medium of claim 8, wherein the beginning point of the selected portion and the ending point of the selected portion identify a boundary of the selected portion.

10. The non-transitory computer readable storage medium of claim 8, wherein the new URL comprises an anchor component, wherein the anchor component comprises an anchor identifier and the portion identifier, wherein the portion identifier is separated from the anchor identifier by a delimiter, and wherein the anchor identifier indicates a specific location at which an anchor exists within the mark-up language document.

11. A non-transitory computer readable storage medium embodied in a computer readable storage medium storing instructions computer-executable to implement:
   receiving a Uniform Resource Locator (URL) for a portion within a mark-up language document, the URL comprising a URL for the mark-up language document, and a portion identifier, wherein the portion identifier specifies a beginning point and an ending point for the portion within the mark-up language document;
   wherein the beginning point comprises:
   one or more characters matching the beginning, but less than all, of the portion and an occurrence number identifying an occurrence of the one or more characters matching the beginning; and
   wherein the ending point comprises:
   one or more characters matching the end, but less than all, of the portion and an occurrence number identifying an occurrence of the one or more characters matching the end;
   extracting the portion identifier from the URL for the portion; and
   locating the portion of the mark-up language document based on the portion identifier.

12. The non-transitory computer readable storage medium of claim 11, further comprising computer instructions for highlighting the portion of the mark-up language document.

13. The non-transitory computer readable storage medium of claim 11, wherein the URL comprises an anchor component, the portion identifier being embedded within the anchor component.

14. The non-transitory computer readable storage medium of claim 13, wherein the anchor component comprises the anchor identifier, the portion identifier being separated from the anchor identifier by a delimiter.

15. A method, comprising:
   receiving user input selecting a portion of a mark-up language document in a display;
   determining a portion identifier for the selected portion, wherein the portion identifier specifies a beginning point comprising one or more start characters and an occurrence number associated with the one or more start characters, and an ending point comprising one or more end characters and an occurrence number associated with the one or more end characters of the selected portion within the mark-up language document;
   obtaining a link to the mark-up language document on a computer network; and
   in response to said receiving, generating a new link including the link to the mark-up language document and the portion identifier.

16. The method of claim 15, wherein the link comprises an anchor component and wherein the portion identifier is embedded within the anchor component.

17. A system, comprising:
   a Web server configured to provide a mark-up language document; and
   a computing device in communication with the Web server, the computing device being configured to execute a Web browser application, the Web browser application comprising computer instructions configured to implement:
   receiving user input selecting a portion of the mark-up language document in a display;
   determining a portion identifier for the selected portion, wherein the portion identifier specifies a beginning point comprising one or more start characters and an occurrence number associated with the one or more start characters, and an ending point comprising one or more end characters and an occurrence number associated with the one or more end characters of the selected portion within the mark-up language document;
   obtaining a Uniform Resource Locator (URL) for the mark-up language document; and
   in response to said receiving, generating a new URL including the URL for the mark-up language document, an anchor identifier, and the portion identifier.

18. The system of claim 17, wherein the Web browser application further comprises computer instructions configured to implement:
   retrieving the mark-up language document;
   receiving a second Uniform Resource Locator (URL) associated with the mark-up language document, the second URL being embedded with the portion identifier;
   extracting the portion identifier from the second URL; and
   locating the portion of the mark-up language document based on the portion identifier.

19. A system, comprising:
   a memory configured to store a portion identifier processing application; and
   a processor in communication with the memory, the processor being configured to execute the portion identifier processing application stored in the memory, the portion identifier processing application comprising program instructions configured to implement:
   receiving user input selecting a portion of a mark-up language document in a display;
   determining a portion identifier for the selected portion, wherein the portion identifier specifies a beginning point comprising one or more start characters and an occurrence number associated with the one or more start characters, and an ending point comprising one or more end characters and an occurrence number associated with the one or more end characters of the selected portion within the mark-up language document;
   obtaining a link to the mark-up language document on a computer network, and
   in response to said receiving, generating a new link including the link to the mark-up language document and the portion identifier.

20. The system of claim 19, wherein the link is a Uniform Resource Locator.

21. The system of claim 19, wherein the link comprises an address component and an anchor component, the portion identifier being embedded into the anchor component.

22. A system, comprising:
   a memory configured to store a portion identifier processing application; and a processor in communication with the memory, the processor being configured to execute the portion identifier processing application stored in the memory, the portion identifier processing application comprising program instructions for:

receiving a link for a portion within a mark-up language document on a computer network, the link comprising a link for the mark-up language document and a portion identifier, wherein the portion identifier specifies a beginning point comprising one or more start characters and an occurrence number associated with the one or more start characters, and an ending point comprising one or more end characters and an occurrence number associated with the one or more end characters for the portion within the mark-up language document;

extracting the portion identifier from the link for the portion, and locating the portion of the mark-up language document based on the portion identifier.

23. The system of claim 22, wherein the portion identifier processing application further comprises program instructions for highlighting the portion of the mark-up language document.

* * * * *